July 16, 1935.  K. E. PEILER  2,008,312

METHOD OF FORMING HOLLOW GLASSWARE

Filed March 25, 1933

Witness:
A. A. Horn

Inventor:
Karl E. Peiler
by Brown + Garham
Attorneys.

Patented July 16, 1935

2,008,312

UNITED STATES PATENT OFFICE 2,008,312

METHOD OF FORMING HOLLOW GLASSWARE

Karl E. Peiler, West Hartford, Conn., assignor to Hartford-Empire Company, Hartford, Conn., a corporation of Delaware Application March 25, 1933, Serial No. 662,650

3 Claims. (Cl. 49—80)

This invention relates to the manufacture of hollow glassware and has particular relation to methods of forming bottles and other containers by the blank or parison system.

The usual parison method involves charging a parison mold and associated neck mold with glass, either by the suction method directly from a pool of glass, or by the feeder narrow neck method, in which case preshaped charges are delivered downwardly from a feeder to the parison mold which is held inverted to receive a charge. The parison then is completed and blown to final form in a finishing mold.

Each method of charging the parison mold and forming the parison has peculiar advantages and results in certain benefits in the finished article.

When the feeder method is used, the preferred practice is to form a relatively large cavity in the parison for the purpose of assisting in distributing the glass in final blowing. It has been proposed to form this cavity in the outer end of the parison and this is called the "hollow ended parison" method. The hollow ended parison method has certain beneficial effects on the ware it tending, for example, to eliminate the settle-wave which frequently occurs in the ordinary feeder narrow neck method.

The general object of this invention is to provide a novel method whereby advantages of both the suction method and the hollow ended parison method may be obtained.

A more specific object of the invention is to provide a novel method wherein the charges of glass are pre-shaped in a suction blank mold unit so as to facilitate the proper introduction thereof into a parison mold, and the formation thereof into parisons by the hollow ended parison method. For these purposes, and to avoid certain defects in the ware, each of the charges or "blanks" preferably is "set-up" on the upper end thereof so that it may be suspended or held up in the cavity of the inverted parison mold in axial alignment therewith and will not drop and/or assume an angular position in said cavity. The "set-up" referred to may be a bead or other enlargement of sufficient size and stiffness to hold the parison as described.

Figure 1:
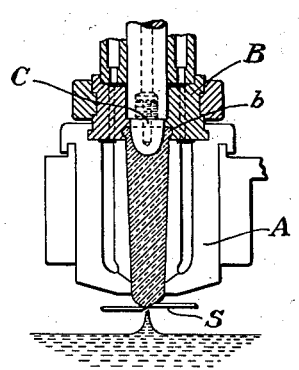
Figure 5:
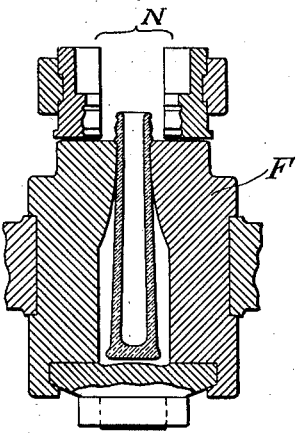
Figure 6:
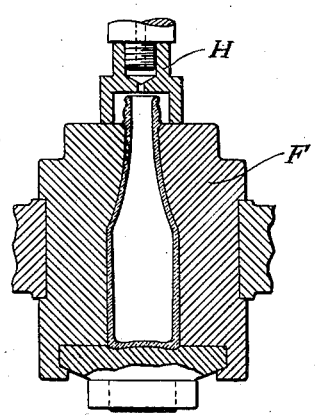
Figure 7:
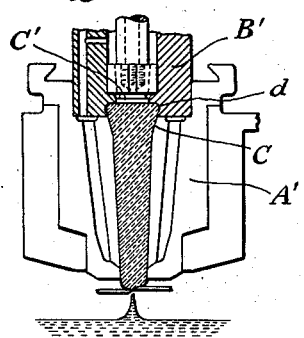

The invention may be more fully understood from the following detailed description which has reference to the accompanying drawing in which:

Figs. 1 to 6 inclusive are views in vertical longitudinal section of molding devices in various positions and depicting various steps in the novel method, and Fig. 7 is a modification of the step shown in Fig. 1.

Considering the method of my invention in detail with particular reference to the drawing, the first step or steps comprise the formation of a blank by the suction method. For this purpose a body mold A is provided with which is associated a butt mold B and a plunger C which projects through the butt mold. The body mold and the butt mold may be formed in sections in the usual way, and provided with passages through which vacuum is applied to gather the glass. The butt mold B preferably has a groove $b$ formed therein to form a bead or lip on the blank. The body mold may be uniformly or otherwise tapered from bottom to top and preferably is of similar shape and substantially the same cross-section at its lower portions as the cavity of the parison body mold P of Fig. 2, hereinafter referred to. This makes it possible to accurately shape the blank to the shape of the parison mold, as shown for example in Fig. 2.

The blank is formed by dipping the blank mold unit into a pool of glass, applying suction, raising the unit and severing the connection by shears such as are partially shown at S, Fig. 1. Means may be employed for automatically operating the parts referred to and in suitably timed relation such as shown for example in my co-pending application, Serial No. 560,428, filed Aug. 31, 1931.

Figure 2:
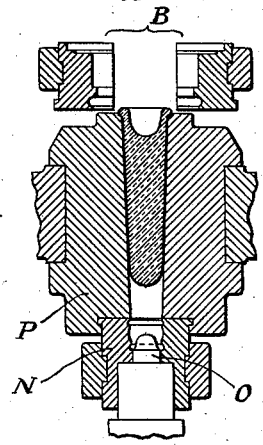

Fig. 2 shows the blank having the lip or bead set up thereon and a blowing cavity formed therein. The set-up of the parison holds it up in the cavity of the parison body mold and in exact axial alignment therewith. Without the set-up, the entire blank would be forced downwardly in the parison mold, leaving a space in the upper end of the parison mold. This is undesirable and is avoided by the set-up.

The shape of the body blank mold and/or butt mold cavities may be varied to change the shape of the body of the parison generally or more particularly the shape of the set-up. One such variation is shown by way of modification in Fig. 7, wherein the body blank mold A' is flared outwardly at its top at $c$ and the butt mold B' shaped to form a continuation of the flare at $d$. In this form, no cavity is formed in the blank, plunger C of Fig. 1 being replaced by a plug C' which forms a flat end on the blank. Thus, when the molds are charged as shown, the blank is set up by having an upwardly and outwardly flaring shape imparted thereto. It will be understood that modification of the blank mold cavity may require appropriate modification of the parison mold cavity to the end that the blank will fit the parison mold as well as possible while held by the set-up in the upper portion of the parison mold.

After the blank is formed by suction, it is of course transferred to the parison mold P as illustrated in Fig. 2. The blank mold A is opened and the butt mold B moved into alignment with the inverted parison mold to make the transfer. Preferably the butt mold is moved in making the transfer to a position in which it almost touches the blank mold and then opened, whereupon the blank drops only slightly to its position in the parison mold. The parison mold P, a neck mold N associated therewith and having a plunger or neck pin O extending therethrough, may constitute the blank or parison mold unit of a narrow neck glassware forming machine of known construction, as shown for example in the patent to Lynch No. 1,788,312, granted Jan. 6, 1931.

It is not essential that the blank be transferred to and/or initially blown in the parison mold as described above. Any well known transfer method may be used. Or if preferred the blank may be held suspended by the suction head and/or plunger and thus positioned in the parison mold. If this is done, the butt mold may be omitted and the head and/or plunger suitably shaped or designed to hold the blank. The blank then may be initially blown in the parison mold by air supplied through the head or plunger to substantially the form shown in Fig. 3. In this procedure, however, it also is preferred to set up the blank to prevent it from being forced bodily into the parison mold. This set up can be formed by the blank mold and serves the same purpose as before except that it does not necessarily support the blank in position prior to the initial blowing as in Fig. 2.

Nor is it essential that the parison mold unit be inverted to receive the blank. The said unit may be held in neck-up position and the blank transferred thereto by inverting the blank before or after opening the blank mold, aligning the blank with the open parison mold and closing the parison mold. When this method of transfer is used, the blank is initially blown upwardly instead of downwardly as in Fig. 3, to expand the blank in the parison mold and into the neck mold.

It will be observed that the blank suspended or held up in the parison mold (Fig. 2) does not completely fill the parison mold P and glass has not yet entered the neck mold N. But as soon as possible after the transfer of the blank, a blowhead H is applied to the bottom of the parison mold and air supplied therethrough to expand the blank into the form shown in Fig. 3. This results in the development of a large outwardly opening cavity in the glass and brings the glass into contact with the entire molding surface of the parison and neck molds.

Inasmuch as the blank is held up in the parison mold by the set-up thereon, the blowing air tends to force the hotter central part of the blank into the bottom of the blank mold and into the neck mold. The unsupported bottom end of the blank expands and/or breaks downwardly and outwardly with a kind of rolling action, the unfilled portions of the mold cavities being filled mostly with hotter interior glass. This avoids stretching the initial skin of the outer body portion of the blank and prevents defects which result from sliding contact of glass and mold.

Figure 3:
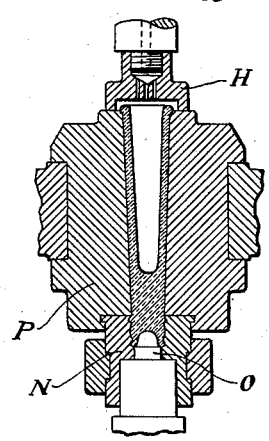
Figure 4:
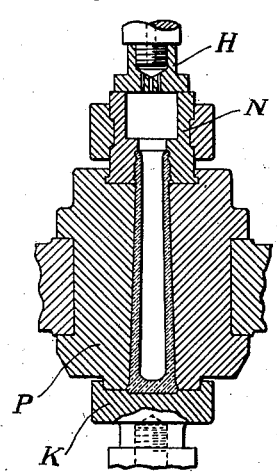

When the step of Fig. 3 is completed, the neck pin and blowhead are withdrawn, a bottom closure K is applied to the parison mold P, and air admitted to the neck mold to blow back the glass to the bottom of the parison mold. To accomplish this, the blank mold unit is reverted to the position shown in Fig. 4, blow head H (or a similar blowhead) then being placed on the neck ring to blow the glass against the closure K. In this way, a hollow parison is formed in which the bubble is developed to large size which aids in properly distributing the glass in the finished article.

The parison is transferred to a finishing mold F, as shown in Fig. 5, and blown to final form therein, as illustrated in Fig. 6.

It will be understood that blowhead H, closure K, finishing mold F, etc., all may be parts of the usual type of narrow neck forming machine, or operated in the same way as similar parts of such a machine.

Having thus described my invention, what I desire to claim is:

1. The method of forming hollow parisons which comprises, charging a partible blank mold and partible butt mold with glass and forming a blank therein, transferring the blank to a parison mold unit comprising a parison mold and a neck mold by removing the blank mold, positioning the blank in alignment with and on approximately the level of the parison mold and releasing the blank to the parison mold, holding the blank in the portion of the parison mold removed from the neck mold and simultaneously applying air to the end of the blank remote from the neck mold to expand the blank in the parison mold and into the neck mold, and thereafter admitting blowing air through the neck mold to form a hollow parison.

2. The method of forming hollow parisons which comprises, charging a mold with glass and forming a blank which is set up on one end so as to limit the bodily movement of the blank within a parison mold, transferring the blank to a parison forming unit including a parison mold and a neck mold and positioning the blank in the parison mold in spaced relation to the neck mold, applying blowing air to the end of the blank remote from the neck mold to expand the same in the parison mold and into the neck mold while held against bodily endwise movement in the parison mold, and admitting blowing air through the neck mold to form a hollow parison.

3. The method of forming hollow parisons which comprises, charging a body mold and a butt mold from the surface of a pool of glass by suction to form a blank which is set up on its upper end so as to limit the bodily descent of the blank within a parison mold, transferring the blank to an inverted parison forming unit including an inverted parison mold and a neck mold therebeneath, the blank being held against bodily movement in the parison mold by the set-up thereon, applying blowing air to the upper end of the blank to expand the same in the parison mold and into the neck mold while held against bodily endwise movement, and admitting blowing air through the neck mold to form a hollow parison.

KARL E. PEILER.